(12) United States Patent
Bansal et al.

(10) Patent No.: US 11,442,712 B2
(45) Date of Patent: Sep. 13, 2022

(54) LEVERAGING UNSPECIFIED ORDER OF EVALUATION FOR COMPILER-BASED PROGRAM OPTIMIZATION

(71) Applicant: Indian Institute of Technology Delhi, New Delhi (IN)

(72) Inventors: Sorav Bansal, New Delhi (IN); Ankush Phulia, New Delhi (IN); Vaibhav Bhagee, New Delhi (IN)

(73) Assignee: INDIAN INSTITUTE OF TECHNOLOGY DELHI, New Delhi (IN)

( * ) Notice: Subject to any disclaimer, the term of this patent is extended or adjusted under 35 U.S.C. 154(b) by 0 days.

(21) Appl. No.: 17/344,375

(22) Filed: Jun. 10, 2021

(65) Prior Publication Data
US 2021/0389935 A1    Dec. 16, 2021

(30) Foreign Application Priority Data

Jun. 11, 2020    (IN) ............................. 202011024593

(51) Int. Cl.
     *G06F 9/45*          (2006.01)
     *G06F 8/41*          (2018.01)
(52) U.S. Cl.
     CPC ................................... *G06F 8/443* (2013.01)
(58) Field of Classification Search
     CPC ............. G06F 8/434; G06F 8/44; G06F 8/443
(Continued)

(56) References Cited

U.S. PATENT DOCUMENTS

| 6,481,007 B1 * | 11/2002 | Iyer ...................... G06F 9/4484 |
| | | 712/E9.082 |
| 6,665,865 B1 * | 12/2003 | Ruf ........................ G06F 8/443 |
| | | 717/157 |

(Continued)

FOREIGN PATENT DOCUMENTS

CN      WO 2016023471 A1 *    2/2018              G06F 3/048

OTHER PUBLICATIONS

Title: Alias Analysis for Optimization of Dynamic Languages, author: Gorbovitski, Michael et al., published on Oct. 2010.*

(Continued)

*Primary Examiner* — Chameli Das
(74) *Attorney, Agent, or Firm* — Workman Nydegger

(57) ABSTRACT

A method, apparatus and system required to realize an optimization opportunity are disclosed. If an expression involves unsequenced evaluations involving side-effects and optionally references, then the expression is translated into optimized code that may involve optimized register usage, or optimized use of the underlying vectorization hardware. An alias-analysis logic is able to identify must-not-alias relationships through such expression tree structures. These must-not-alias relationships are helpful not just in optimizing the performance of that particular expression (from which these must-not-alias relationships were derived) but also in the performance of any other surrounding program statements that access the state elements participating in these must-not-alias relationships. More specifically, if the order of evaluation is unspecified and the sub expressions generate side effects, then must-not-alias relationships are inferred between expressions which can be used while optimizing surrounding code, such as the instructions following this expression with unsequenced evaluation.

9 Claims, 10 Drawing Sheets

(58) Field of Classification Search
USPC .......................................................... 717/144
See application file for complete search history.

(56) References Cited

U.S. PATENT DOCUMENTS

| | | | | |
|---|---|---|---|---|
| 7,743,370 | B1* | 6/2010 | Krablin | .................... G06F 8/443 |
| | | | | 717/157 |
| 7,818,729 | B1* | 10/2010 | Plum | .................... G06F 11/3624 |
| | | | | 717/145 |
| 8,468,507 | B2* | 6/2013 | Agarwal | ................. G06F 8/443 |
| | | | | 717/137 |
| 2004/0205320 | A1* | 10/2004 | Haugen | .................... G06F 8/443 |
| | | | | 717/151 |
| 2008/0134159 | A1* | 6/2008 | Guo | ..................... G06F 9/45516 |
| | | | | 717/154 |
| 2009/0217016 | A1* | 8/2009 | Bonanno | ............... G06F 9/3806 |
| | | | | 712/240 |
| 2012/0198428 | A1* | 8/2012 | Schmidt | .............. G06F 9/30189 |
| | | | | 717/153 |
| 2013/0055207 | A1* | 2/2013 | Cui | ......................... G06F 8/434 |
| | | | | 717/125 |
| 2014/0022861 | A1* | 1/2014 | Edme | ..................... G01V 13/00 |
| | | | | 367/38 |

OTHER PUBLICATIONS

Title: Precise flow-insensitive may-alias analysis is NP-hard, author: S Horwitz, published on Jan. 1997.*
Title: OOElala: Order-of-evaluation based alias analysis for compiler optimization, author: A Phulia et al, published on Jun. 15, 2020.*
Title: Extending automatic parallelization to optimize high-level abstractions for multicore, author: C Liao et al., published oh 2009.*
Titie: Optimistic loop optimization, author: J Doerfert, published on 2017.*
Title: Type-based alias analysis, author: A Diwan, published on 1998.*

* cited by examiner

```
expression = atom    | expr + expr | expr = expr | expr += expr | expr / expr | ...
atom       = number | variable
number     = [+-]?[`0'-`9']+
variable   = [`A'-`Z'][`A'-`Z'`0'-`9'].*
```

$(*p = 1) + (*q = 0)$ $(*p,*q)$ must-not-alias$(*p, *q)$

```
void kernel(int **X, int *W, int N) {
    for (int i = 0; i < N; i++) {
        W[i] = 0;
        for (int j = 0; j < N; j++) {
            W[i] += (X[i][j] = i * j);
        }
    }
}
```

Statement

Inference drawn on statement level

W[i] and X[i][j] cannot alias

LEVERAGING UNSPECIFIED ORDER OF EVALUATION FOR COMPILER-BASED PROGRAM OPTIMIZATION

FIELD OF THE INVENTION

The present disclosure generally relates to apparatus and system for enabling vectorization and related optimizations based on a Non-deterministic Order-of-Evaluation (OOE) Semantics.

BACKGROUND OF THE INVENTION

FIG. 1 illustrates an example grammar of a programming language (PL) with expressions. The grammar of a Programming Language (PL) usually involves Expressions (FIG. 1) that may be represented as syntactic trees involving special operators. These operators could be basic low-level operators such as logical (e.g., AND, OR, XOR, etc.), arithmetic (e.g., ADD, SUBTRACT, MULTIPLY, etc.), and data-movement operators (e.g., ASSIGNMENT, COMPOUND-ASSIGNMENT, etc.), or they could be more complex higher-level operators such as MAP, SORT, REDUCE, MATRIX-MULTIPLY, etc., related to operations involving manipulation of larger data structures (e.g., sets of data elements, or multi-dimensional matrices). The PL also specifies the semantics of such expression trees, indicating how such expressions are evaluated. The semantics of some of these operators may involve memory writes, also called side effects. For example, the ASSIGNMENT and COMPOUND-ASSIGNMENT (see FIG. 1 for example) operators involve side effects.

Depending on the PL, the order of evaluation of these expression trees may be specified or it may be left unspecified (FIG. 2). In FIG. 2, the order of evaluation of an expression may be unspecified. In this example, either e1 may be evaluated before e2 or vice-versa. It is also possible that they are evaluated in parallel. e1, e2 may involve side-effects and references and are especially useful for compilation to parallel computing substrates like FPGAs. For CPUs, this allows flexibility in instruction scheduling, register allocation, and enables vectorization.

Using unspecified order of evaluation provides better optimization opportunity as it allows flexibility in the execution order in hardware. If the evaluation order is unspecified, then parts of an expression tree may be evaluated concurrently, i.e., in parallel. Often, the PL may require that the memory accesses involved in the sub-expressions that may be evaluated concurrently are devoid of any data race. For example, in C, it is necessary that unsequenced evaluations (i.e., evaluations that may occur concurrently) do not produce a side-effect and a memory read (also called reference) to the same memory location (or object). This allows better optimization during expression evaluation. For example, this may allow different parts of an expression to be evaluated in parallel, on a parallel computing substrate (FIG. 3). More importantly, as per FIG. 3, if the order of evaluation is unspecified, the two parts of an expression (e1 and e2) may be evaluated in parallel.

There lies at least a need for the additional optimization opportunities that Unspecified Order-of-Evaluation semantics (such as those in C language) entail.

There lies at least a need for the method, apparatus, and system required to exploit these additional optimization opportunities, and result improvements.

SUMMARY OF THE INVENTION

This summary is provided to introduce a selection of concepts in a simplified format that are further described in the detailed description of the invention. This summary is not intended to identify key or essential inventive concepts of the claimed subject matter, nor is it intended for determining the scope of the claimed subject matter.

The present subject matter refers the method, apparatus and the system required to realize an optimization opportunity. If an expression involves unsequenced evaluations involving side-effects and optionally references, then the method is able to translate this into optimized code that may involve optimized register usage, or optimized use of the underlying vectorization hardware. The system includes an alias-analysis logic that is able to identify must-not-alias relationships through such expression tree structures. These must-not-alias relationships are helpful not just in optimizing the performance of that particular expression (from which these must-not-alias relationships were derived) but also the performance of any other surrounding program statements that access the state elements participating in these must-not-alias relationships (FIG. 4). More specifically, if the order of evaluation is unspecified and the sub expressions generate side effects, then must-not-alias relationships between expressions are inferred which can be used while optimizing surrounding code, e.g., the instructions following this expression with unsequenced evaluation.

To further clarify advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

The present disclosure will become better understood when the following detailed description is read with reference to the accompanying drawings in which like characters represent like parts throughout the drawings, wherein:

FIG. 1 illustrate state of the art scenario;

FIG. 2 illustrates state of the art scenario;

FIG. 6 illustrates an example-solution in accordance with the present subject matter.

FIG. 8 illustrates the logic to compute the relevant sets required to infer must-not-alias relationships as described in FIG. 7;

DETAILED DESCRIPTION OF THE DRAWINGS

Figures 3, 4:
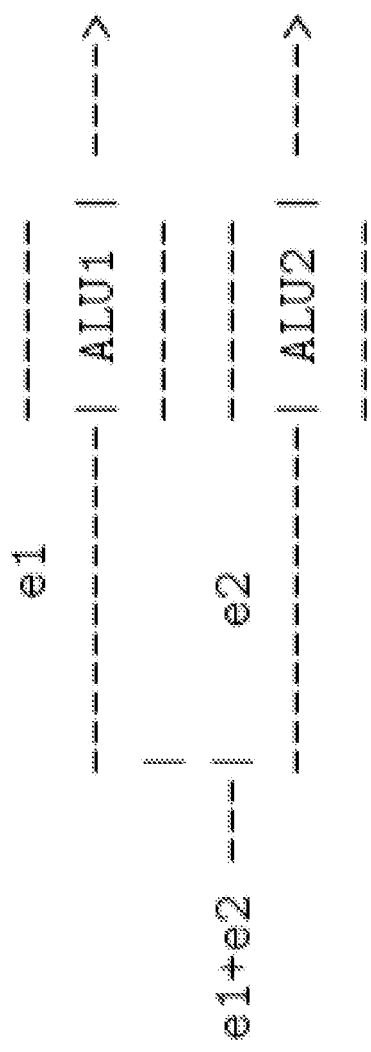
FIG. 3 illustrates illustrate state of the art scenario.
FIG. 4 illustrates identification of relationships for optimization, in accordance with an embodiment of the present subject matter.

It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more sub-systems or elements or structures or components proceeded by "comprises . . . a" does not, without more constraints, preclude the existence of other UE or other sub-systems or other elements or other structures or other components or additional UE or additional sub-systems or additional elements or additional structures or additional components.

Unless otherwise defined, all technical and scientific terms used herein have the same meaning as commonly understood by one of ordinary skilled in the art to which this disclosure belongs. The system, method, and examples provided herein are illustrative only and not intended to be limiting.

The present subject matter at least addresses current state-of-the-art in code optimization during compilation of a programming language's instructions to low-level hardware instructions. Also it is based on the semantics of modern programming languages. At least an apparatus is provided to identify these optimization opportunities and to execute them during the compilation of the PL instructions to hardware-level instructions. The modules in the described embodiment include multiple sets.

In C-language, the order of evaluation of expressions is unspecified, further for expressions that do not involve function calls. C semantics ensure that there cannot be a data race between two evaluations that can proceed in either order (or concurrently). The present subject matter refers the optimization opportunity enabled by these non-deterministic expression evaluation semantics in C, and provide a sound compile-time alias analysis to realize the same. The present subject matter is implemented as a part of the Clang/LLVM infrastructure. The alias analysis enables performance of optimizations that are not currently performed by state of the art GCC, Clang/LLVM or ICC. The extra optimizations as enabled include vectorization, improved register allocation, selection and instruction scheduling.

The present subject matter may not be constrained with respect to operating over a particular programming language, but to a general class of programming languages that include non-deterministic expression evaluation as a language feature. These may include low-level languages like assembly language (for an hardware ISA), portable languages like web assembly, higher level languages like C, Java, Rust, Haskell, etc., distributed computing languages like MapReduce and DryadLINQ, special purpose languages like CUDA, OpenCL, etc., domain-specific languages like TensorFlow, and others.

Merely as an example without being construed as a limitation, the present subject matter has been referred in the context of the C programming language, to ground the discussion with respect to a particular language and environment. The present invention focuses on the undefined behavior (UB) associated with data races that may occur during the evaluation of the unsequenced portions of a C expression. Such data races are referred as unsequenced races to distinguish them from the data races caused due to multi-threading.

In operation, a static analysis pass on the program's abstract syntax tree (AST) infers must-not-alias relationships between the program values based on these UB semantics, and makes the results of this analysis available to subsequent transformation passes. The present method has been implemented inside the Clang/LLVM framework, and refers the enhanced compiler for operation. The extra must-not-alias information generated enables optimizations like register-allocation and vectorization, leading to significant (up to 2.6×) processing performance improvements.

Further, the present subject matter derives an LLVM-based sanitizer from static analysis method to catch OOE-based UB at runtime. The sanitizer may be tested running the benchmarks compiled with the present method with the sanitizer's runtime checks, and renders zero assertion failures. This indicates that the programmers' code patterns were perhaps not bugs, but conscious choices.

While it is true that non-determinism encourages programming errors, disabling it may not always be the solution. In accordance with the present subject matter, it may be more appropriate to provide the required tool support (e.g., UB sanitizer) to detect errors early.

Figure 5:
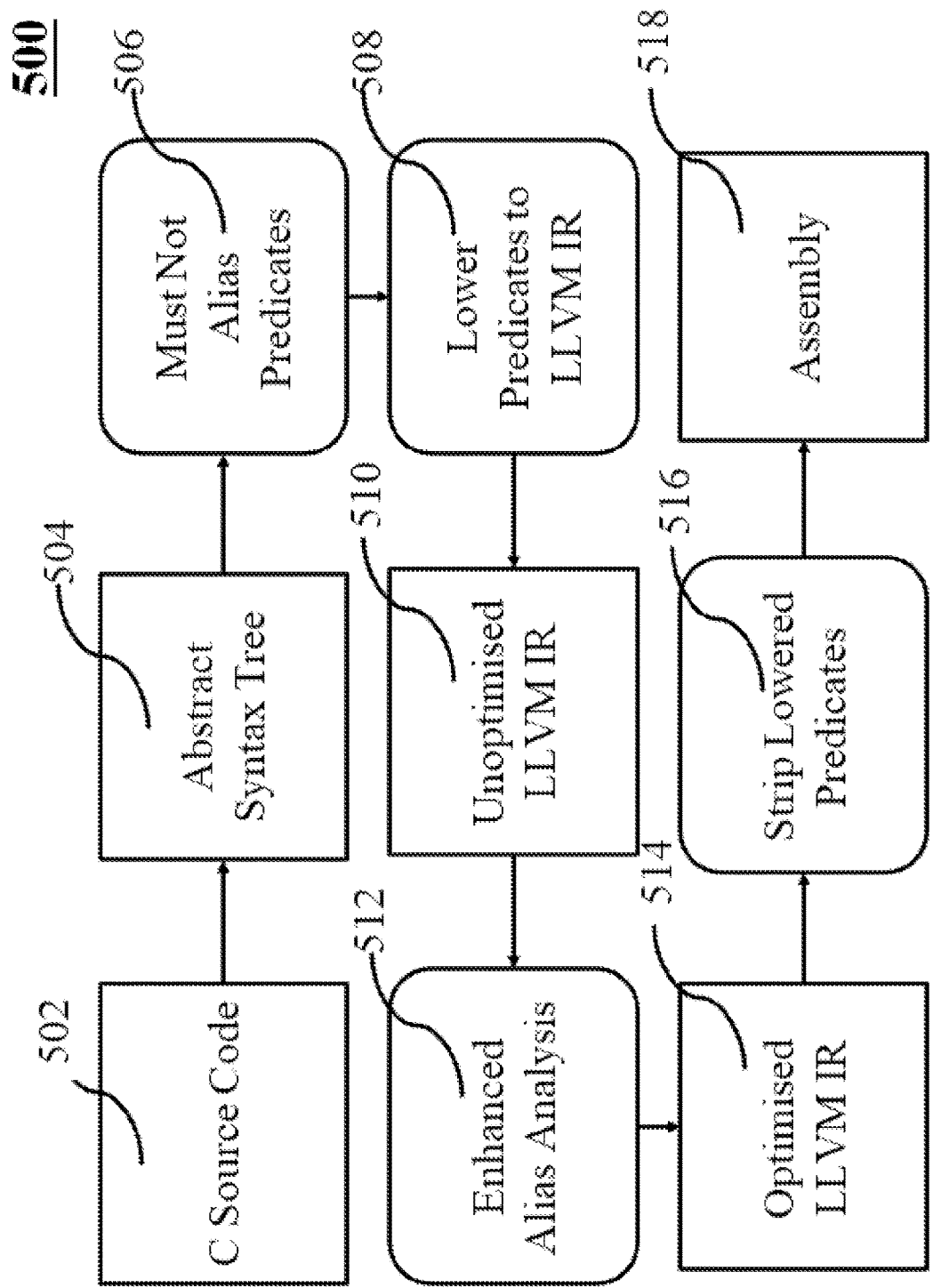
FIG. 5 illustrates method of operation in accordance with an embodiment of the present subject matter.

FIG. 5 refers method steps in accordance with the present subject matter.

At step 502 and 504, the source code is first converted to the Abstract Syntax Tree (AST).

At step 506, expressions containing unsequenced side-effects are identified based on a traversal of the AST to thereby identify must-not-alias relationships. More specifically, the expressions with potentially unsequenced side-effects are identified through a bottom-up traversal of the AST.

At step 508, Must-not-alias relationships are derived from these expressions with unsequenced side effects. A must-not-alias relationship is represented through a pair of LValues (representing memory objects) in the Programming Language.

At step 510, the identified must-not-alias relationships with corresponding expressions are encoded into one or more language-independent intermediate representation (IR). The must-not-alias relationships are encoded into the linear Intermediate Representation (IR). The encoding comprises applying an intrinsic function call in LLVM IR, i.e. through a custom function call to encode the must-not-alias relationships along with the actual expressions themselves to thereby result in a non-optimized IR representation.

In an example, a dummy function call (e.g., intrinsic function call in LLVM IR) is used to encode these must-not-alias relationships. For example, a dummy function call mustNotAlias (X,Y) indicates that variable X must not alias with variable Y. Moreover, it is ensured that the presence of X and Y does not otherwise hamper the optimization pipeline that operates on the IR. In LLVM IR, this can be achieved by "wrapping" X and Y into metadata nodes which are treated as auxiliary information by the LLVM optimization engine. Accordingly vide step 510, an unoptimized IR representation of the program is obtained, where the must-not-alias relationships are available inline with the IR code.

Overall, the aforesaid steps 502 till 510 depict an implementation inside Clang/LLVM, after the stage where the Abstract Syntax Tree (AST) has been formed for the program being compiled, and before the LLVM IR is generated. The must-not-alias relationships are computed and encoded through LLVM's intrinsic calls emitted into the LLVM IR code just before the code for evaluating the respective expression (which uses a deterministic OOE). These (debug) intrinsic calls encode the required must-not-alias predicates and it is ensured that they do not otherwise affect the compiler's optimizations in any way. For each expression with unsequenced side-effects, multiple intrinsic calls may be generated, one for each must-not-alias predicate. The forthcoming steps 512-514 depict that these intrinsic calls are parsed and these relationships are exposed to LLVM's alias-analysis subsystem.

At step 512 and 514, optimization passes are executed on the non-optimized IR to generate an optimized intermediate representation (IR). The passes are based on extracting indication about relationships not recommended for aliasing, wherein such indication is received as a response from one or more encoded relationships though said custom function call. Based thereupon, the relationships not recommended for aliasing are detected based on the response. Accordingly, it is ensured that the function call does not interfere with the optimization procedure.

More specifically as a part of step 512, the optimization passes are executed on the unoptimized IR. During these optimization passes, the compiler makes aliasing queries of the type, "does lvalue X alias with lvalue Y". Some of the potential responses to such queries are MAY-ALIAS (X may alias with Y in some program executions), MUST-ALIAS (X must alias with Y in all program executions), or MUST-NOT-ALIAS (X must not alias with Y in all program executions).

During the steps 512 and 514, during these aliasing queries, the must-not-alias relationships are identified through the AST (in steps 504 and 506) and made available in the IR (in step 508) are also used to construct a response. For example, had AST analysis inferred a must-not-alias relationship between X and Y, then the query response would have been MUST-NOT-ALIAS.

At step 516, before the final assembly code is generated, the function call that was used for encoding relationships from the optimized IR is removed. More specifically, the calls to dummy mustNotAlias function is removed. As may be understood, the dummy calls were just used to construct the responses to the aliasing queries and not meant to be emitted in the final executable code.

At step 518, a final assembly code is generated.

Further, a programming tool may be provided in accordance with the present subject matter that allows a programmer to explicitly specify must-not-alias relationships in his/her program. These relationships may be codified through a special CANT ALIAS( ) construct (as discussed in steps 502-518 that that deliberately constructs an expression involving unsequenced evaluations with side-effects. Accordingly, the tool is able to automatically identify the must-not-alias relationships through the CANT ALIAS( ) construct, and appropriate these relationships to generate more optimized implementations that allows better use of hardware resources (i.e. processor, memory). More specifically, the tool refers a UB-sanitizer that instruments the program with runtime assertion checks to ensure that the program behaviour is not undefined for the provided inputs. The sanitizer converts the must-not-alias predicates into runtime checks asserting that the two arguments of these predicates do not alias.

FIG. 6 illustrates an example-solution in accordance with the present subject matter.

As may be understood, for the deduction of MUST NOT ALIAS relationship within the code, a global program context is otherwise required to draw inference. On the other hand, the present method subject matter is able to execute the deduction only based on the statement level as has been highlighted in FIG. 6. In other words, patterns are identified which enable optimization. In an example a CANT_ALIAS macro is provided to annotate must-not-alias relationships. Moreover, a sanitizer is implemented to catch related UB in code The same at least enables optimizations, register allocation and loop vectorization.

Moreover, a processing speed augmentation of about 2.6 times to 4.6 times is achieved over GCC/Clang O3 optimised real world code.

Figure 7:
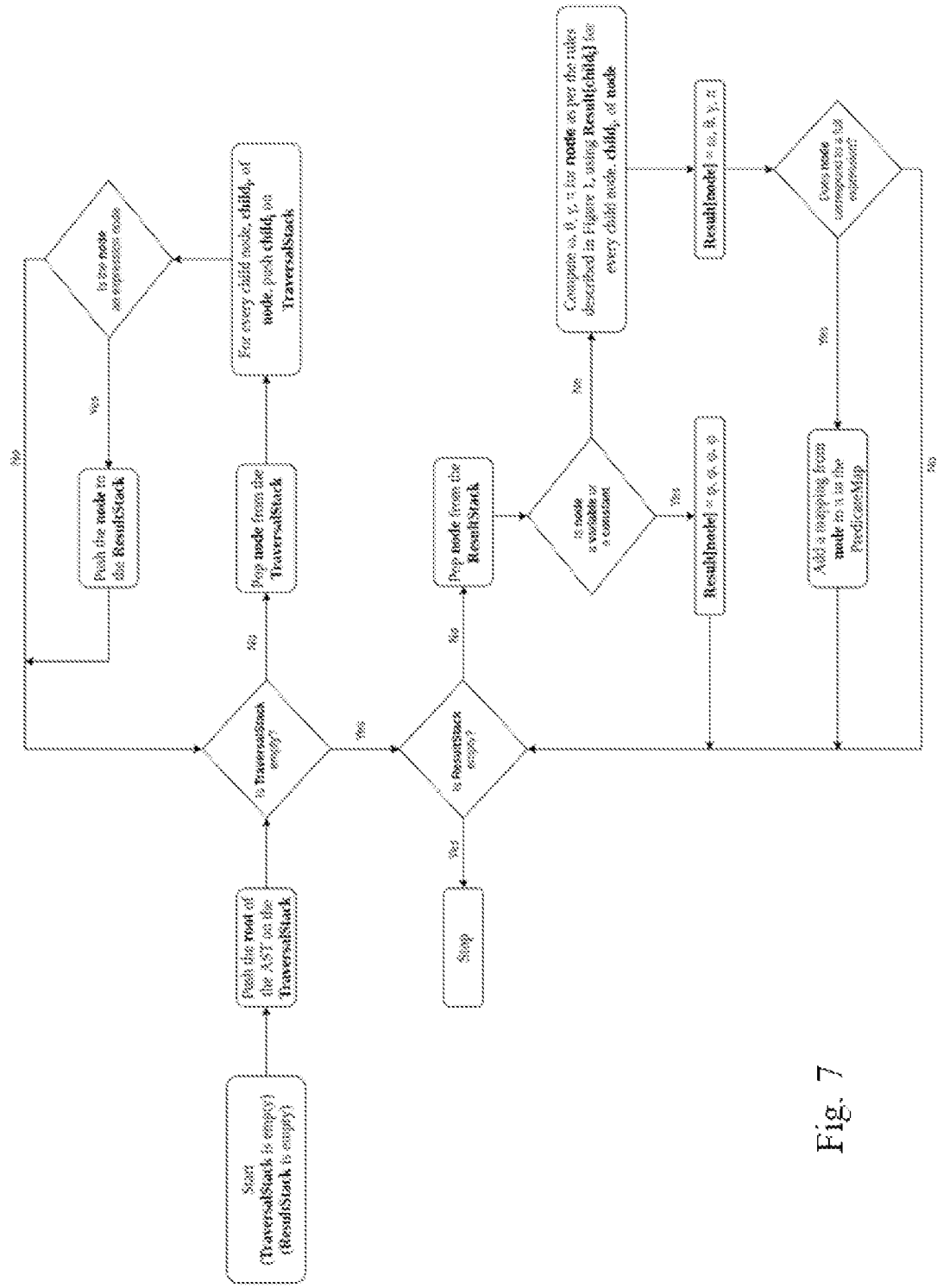
FIG. 7 illustrates the flowchart of the logic to infer must-not-alias relationships from a C expression tree.

FIG. 7 shows a flowchart of the logic used to identify the must-not-alias relationships inferred from the AST of a C expression and accordingly refers to step 506 of FIG. 5. This recursive logic involves a bottom-up traversal of the expression tree while computing sets $\omega$, $\theta$, $\gamma$, $\pi$. These sets are computed for every node in the AST of the C expression as described through inference rules.

Figure 8:
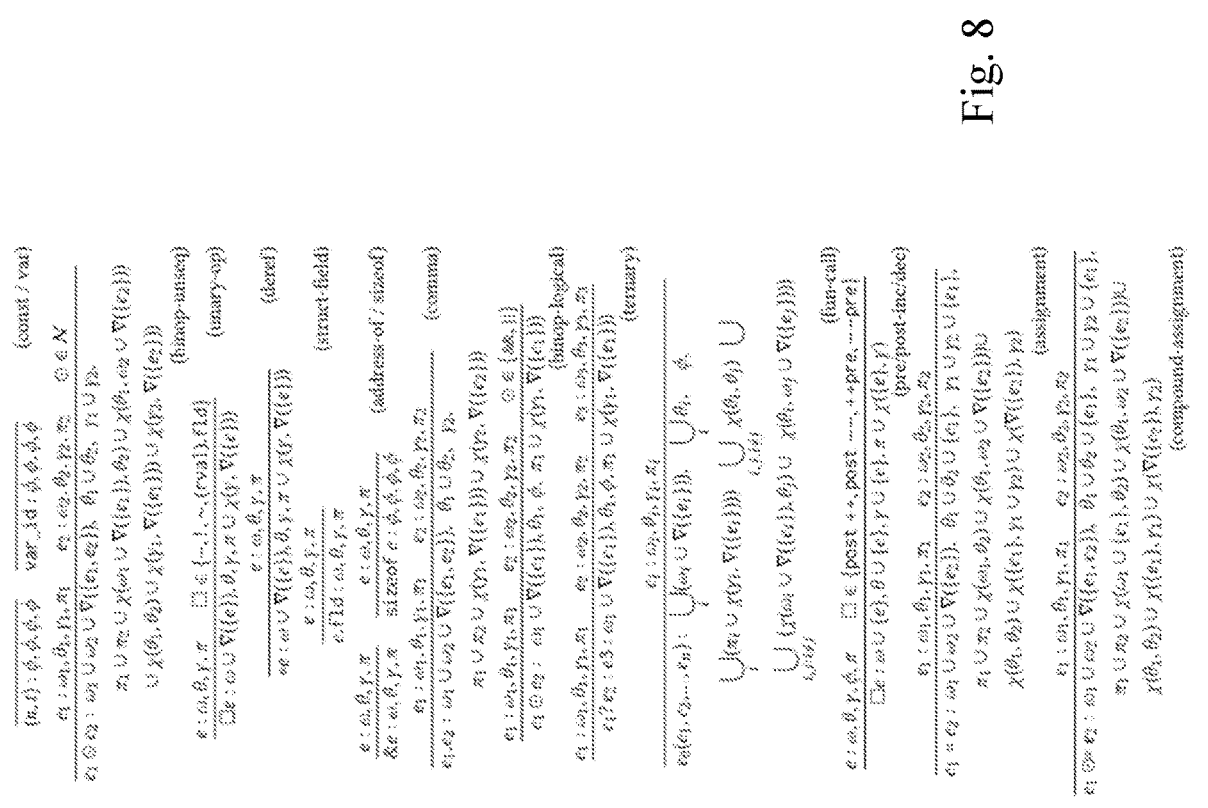

FIG. 8 illustrates logic to compute the relevant sets (required to infer must-not-alias relationships as described in FIG. 7) as a set of inference rules on the C expression tree. In this figure, the $\nabla(S)$ operator operates on a set of expression-ids S, and returns only those elements in S that are non-array lvalues. $\phi$ represents the empty set. e.fld represents a struct field access, and the evaluated expression can either be an lvalue or an rvalue depending on e. $\chi(s1,s2)$ returns the cartesian product of sets s1 and s2. N={+, *, −, /, %, ^, |, &, <<, >>, <, >, <=, >=, =+, !=}. e1[e2] and s→fld are treated like *(e1+e2) and (*s).fld respectively.

These sets $\omega$, $\theta$, $\gamma$, $\pi$ associated with a node N of the expression tree encode that: If the (sub)expression represented by node N is evaluated, then (a) it generates at least $\omega$ memory references. (b) It generates at least $\theta$ side effects. (c) $\gamma \subseteq \theta$ are the side effects that are not followed by a sequence point in at least one evaluation of N. (d) At least $\pi$ must-not-alias relationships can be inferred from N's evaluation.

$\omega$, $\theta$, and $\gamma$ are sets of C lvalue sub-expressions of id, and $\pi$ is a set of unordered pairs of such lvalue sub-expressions. These lvalue subexpressions (named using their identifiers) represent memory objects that are either read ($\omega$) or written ($\theta$, $\gamma$); for every subexpression pair $(N_i, N_j) \in \pi$, it must be true that the evaluations of $N_i$ and $N_j$ cannot alias for the full expression evaluation to be well-defined on any initial state. Also note the antecedent of this judgement: these properties are true only if the expression gets evaluated.

Figure 9:
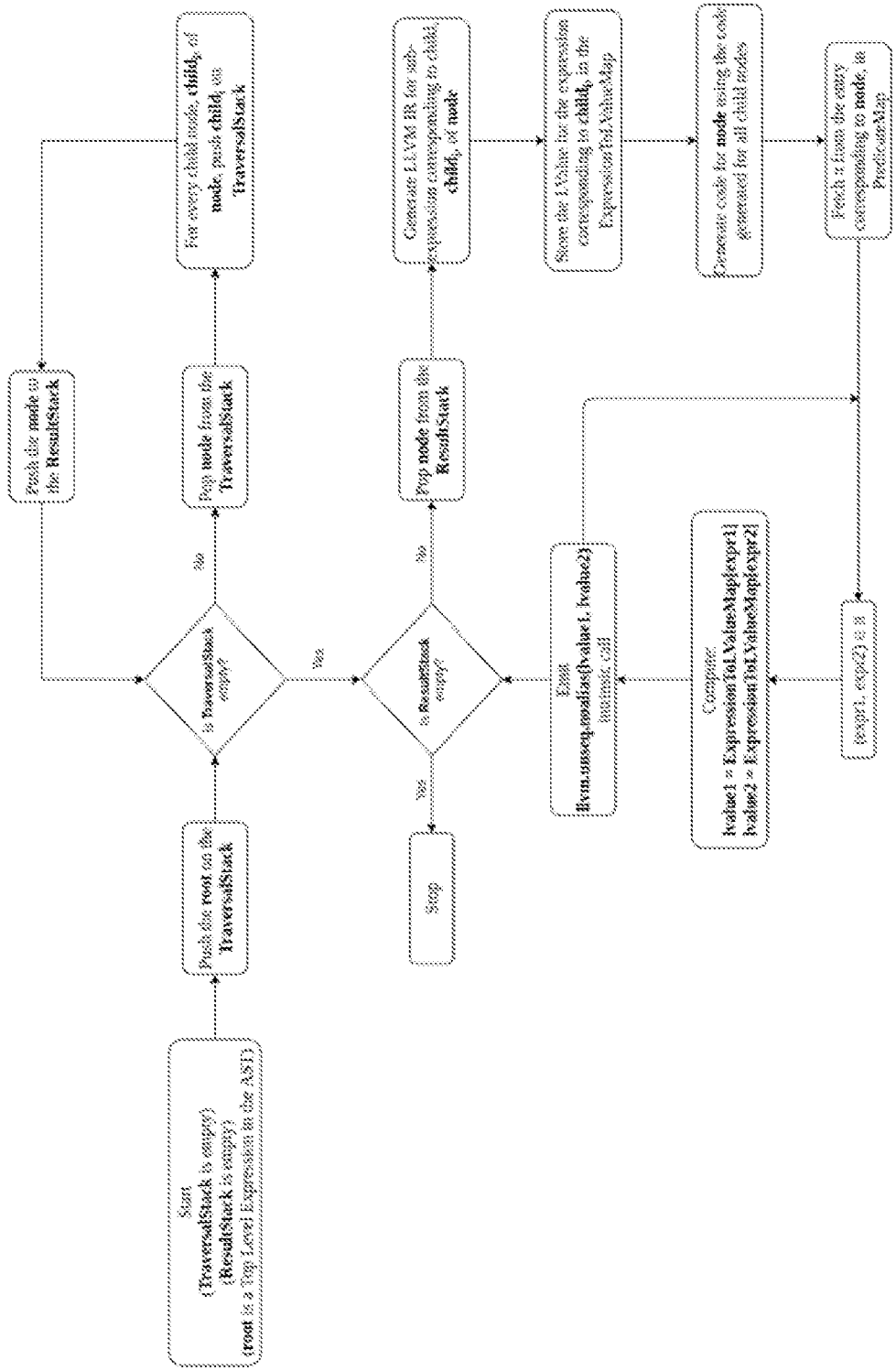
FIG. 9 illustrates the flowchart of the logic to lower the C Abstract Syntax Tree to LLVM IR instructions, including the calls to the dummy function encoding the must-not-alias relationships.

FIG. 9 shows the flowchart of the logic for translating the AST of a C expression into a linear Intermediate Representation (IR) and accordingly refers the step 508 of FIG. 5. During this translation, any inferred must-not-alias relationships (set $\pi$) are encoded through calls to a dummy function (llvm.unseq.noalias).

Figure 10:
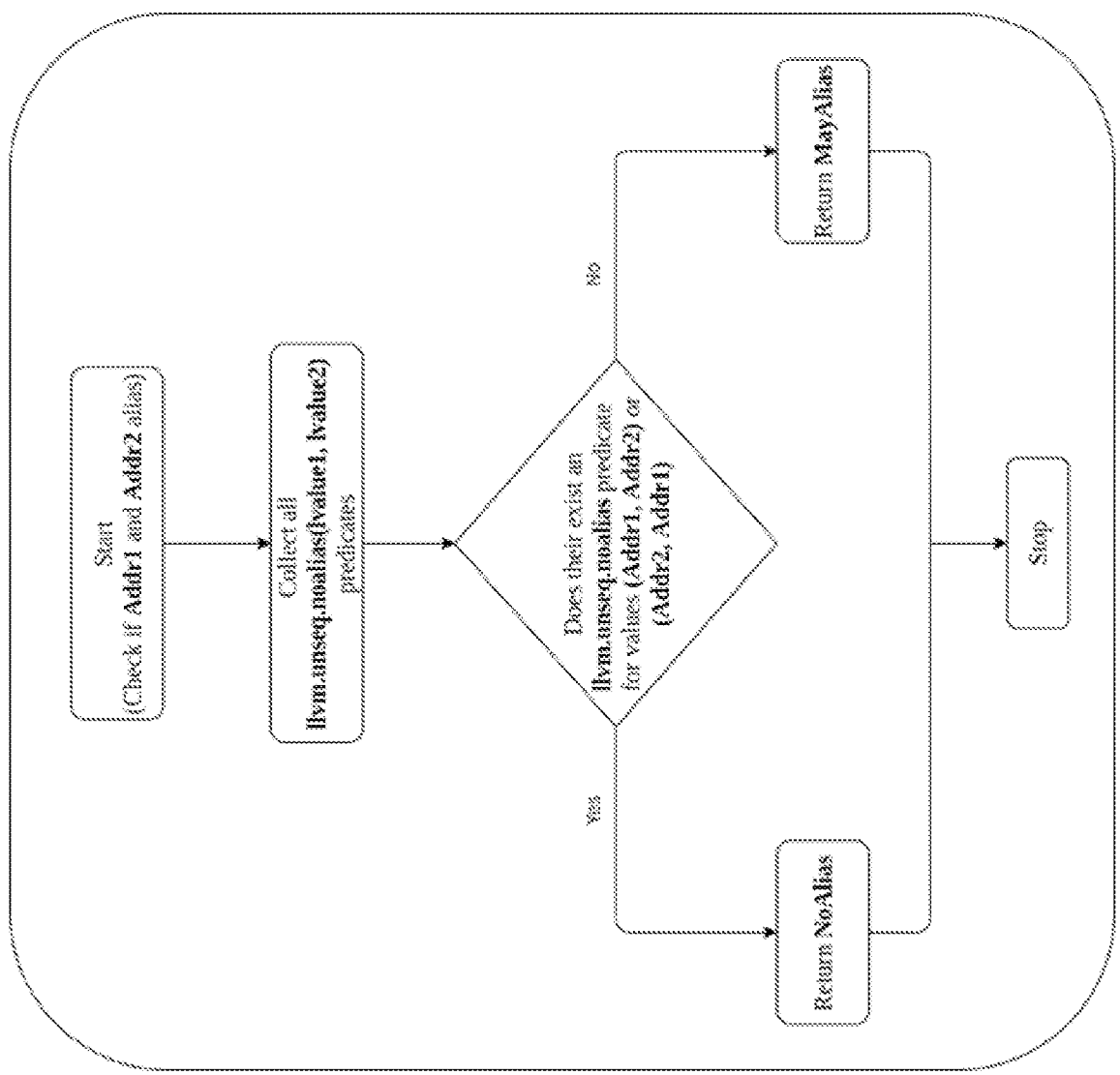
FIG. 10 illustrates the flowchart of the logic used to respond to the aliasing queries, using the inferred must-not-alias relationships, during optimization passes.

FIG. 10 shows the logic used to respond to aliasing queries using the encoded must-not-alias relationships, during optimization passes and accordingly refers the step 512 and 514 of FIG. 5. If an encoded must-not-alias relationship exists in the IR, a must-not-alias response is generated; else a may-alias response is generated. This logic works in tandem with other techniques to infer aliasing relationships.

Figure 11:
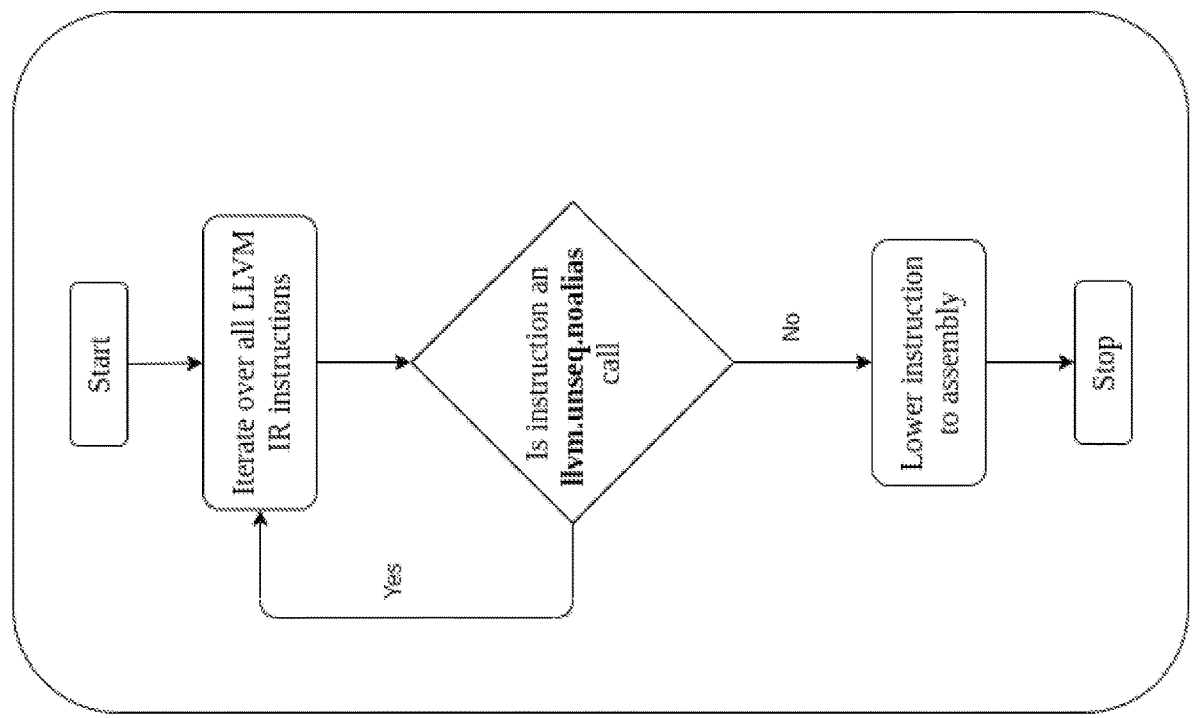
FIG. 11 illustrates the flowchart of the logic used to remove the calls to the dummy function (that encodes must-not-alias relationships) during lowering of IR to executable assembly code.

FIG. 11 shows the logic to lower the IR to assembly code while removing any calls to the dummy function (llvm.unseq.noalias) encoding the must-not-alias relationships and accordingly refers the step 516 of FIG. 5.

Figure 12:
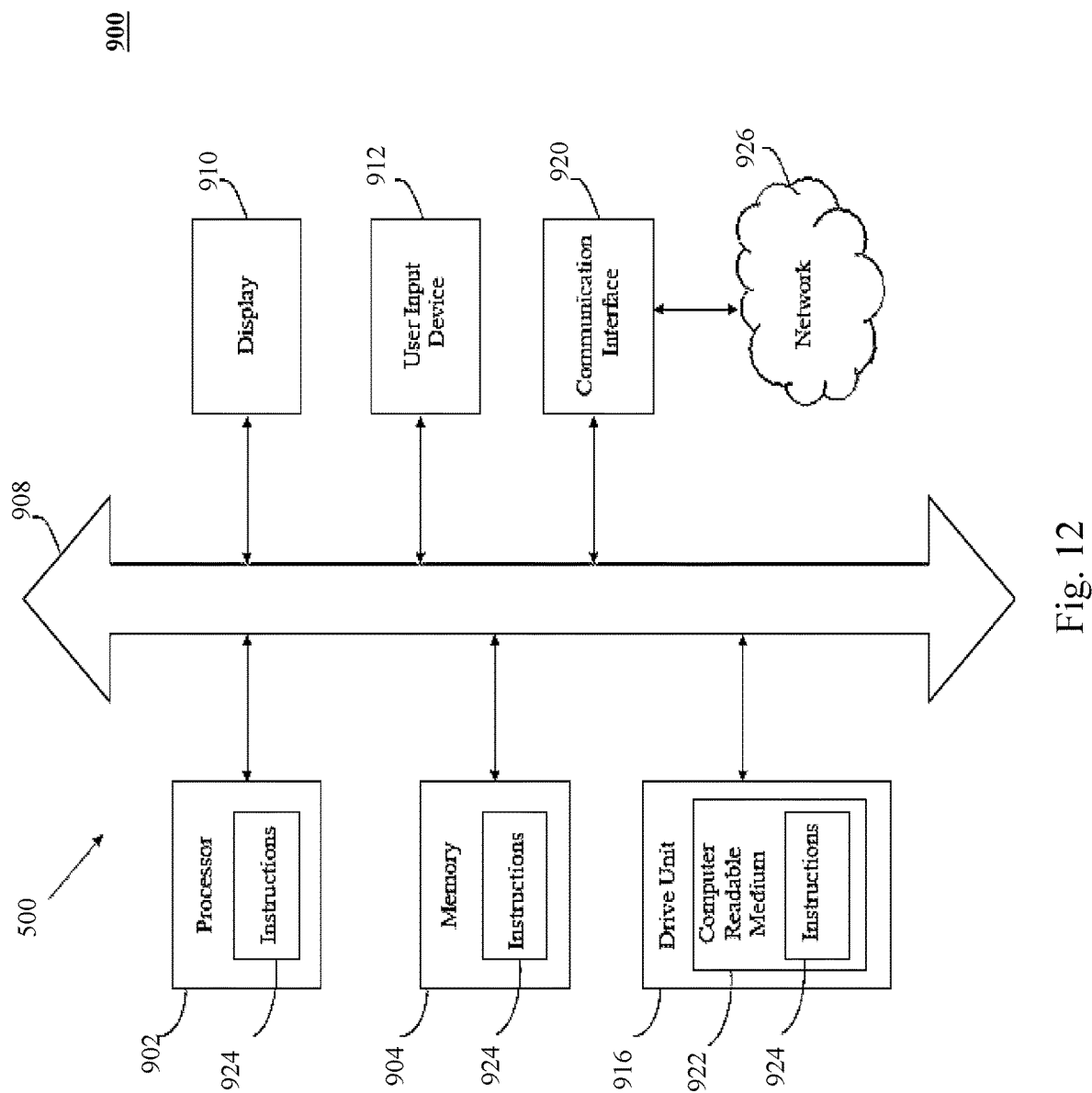
FIG. 12 illustrates an example computing system which is used to execute the optimization logic, and the eventual optimized program.

FIG. 12 shows yet another exemplary implementation in accordance with the embodiment of the invention, and yet another typical hardware configuration of a system for executing the method 500, in the form of a computer-system 900. The computer system 900 can include a set of instructions that can be executed to cause the computer system 900 to perform any one or more of the methods disclosed. The computer system 900 may operate as a standalone-device or may be connected, e.g., using a network, to other computer systems or peripheral devices.

In a networked deployment, the computer system 900 may operate in the capacity of a server or as a client user computer in a server-client user network environment, or as a peer computer system in a peer-to-peer (or distributed) network environment. The computer system 900 can also be implemented as or incorporated across various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 900 is illustrated, the term "system" shall also be taken to include any collection of systems or sub-systems that individually or jointly execute a set, or multiple sets, of instructions to perform one or more computer functions.

The computer system 900 may include a processor 902 e.g., a central processing unit (CPU), a graphics processing unit (GPU), or both. The processor 902 may be a component in a variety of systems. For example, the processor 902 may be part of a standard personal computer or a workstation. The processor 902 may be one or more general processors, digital signal processors, application specific integrated circuits, field programmable gate arrays, servers, networks, digital circuits, analog circuits, combinations thereof, or other now known or later developed devices for analysing and processing data. The processor 902 may implement a software program, such as code generated manually (i.e., programmed).

The computer system 900 may include a memory 904, such as a memory 904 that can communicate via a bus 908. The memory 904 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 904 includes a cache or random access memory for the processor 902. In alternative examples, the memory 904 is separate from the processor 902, such as a cache memory of a processor, the system memory, or other memory. The memory 904 may be an external storage device or database for storing data. The memory 904 is operable to store instructions executable by the processor 902. The functions, acts or tasks illustrated in the figures or described may be performed by the programmed processor 902 for executing the instructions stored in the memory 904. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 900 may or may not further include a display unit 910, such as a liquid crystal display (LCD), an organic light emitting diode (OLED), a flat panel display, a solid state display, a cathode ray tube (CRT), a projector, a printer or other now known or later developed display device for outputting determined information. The display 910 may act as an interface for the user to see the functioning of the processor 902, or specifically as an interface with the software stored in the memory 904 or in the drive unit 916.

Additionally, the computer system 900 may include an input device 912 configured to allow a user to interact with any of the components of system 900. The computer system 900 may also include a disk or optical drive unit 916. The disk drive unit 916 may include a computer-readable medium 922 in which one or more sets of instructions 924, e.g. software, can be embedded. Further, the instructions 924 may embody one or more of the methods or logic as described. In a particular example, the instructions 924 may reside completely, or at least partially, within the memory 904 or within the processor 902 during execution by the computer system 900.

The present invention contemplates a computer-readable medium that includes instructions 924 or receives and executes instructions 924 responsive to a propagated signal so that a device connected to a network 926 can communicate voice, video, audio, images or any other data over the network 926. Further, the instructions 924 may be transmitted or received over the network 926 via a communication port or interface 920 or using a bus 908. The communication port or interface 920 may be a part of the processor 902 or may be a separate component. The communication port 920 may be created in software or may be a physical connection in hardware. The communication port 920 may be configured to connect with a network 926, external media, the display 910, or any other components in system 900, or combinations thereof. The connection with the network 926 may be a physical connection, such as a wired Ethernet connection or may be established wirelessly as discussed later. Likewise, the additional connections with other components of the system 900 may be physical connections or may be established wirelessly. The network 926 may alternatively be directly connected to the bus 908.

The network 926 may include wired networks, wireless networks, Ethernet AVB networks, or combinations thereof. The wireless network may be a cellular telephone network, an 802.11, 802.16, 802.20, 802.1Q or WiMax network. Further, the network 926 may be a public network, such as the Internet, a private network, such as an intranet, or combinations thereof, and may utilize a variety of networking protocols now available or later developed including, but not limited to TCP/IP based networking protocols. The system is not limited to operation with any particular standards and protocols. For example, standards for Internet and other packet switched network transmission (e.g., TCP/IP, UDP/IP, HTML, HTTP) may be used While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to the problem and any component(s) that may cause any benefit, advantage, or solution to occur or become more pronounced are not to be construed as a critical, required, or essential feature or component of any or all the claims.

What is claimed is:

1. A method of compiler-operation in a computing system comprising:
   converting a source code into an abstract syntax tree (AST);
   identifying expressions involving unsequenced evaluations that include side-effects based on a traversal of the AST to thereby identify must-not-alias relationships;
   encoding the identified must-not-alias relationships with corresponding expressions into one or more language-independent intermediate representation (IR) through a custom intrinsic function call to thereby result in a non-optimized IR representation;
   executing optimization passes on the non-optimized IR to generate an optimized IR based on at least one of:
   extract an indication about must not alias relationships not recommended for aliasing, said indication received as a response from one or more encoded must not alias relationships through said custom intrinsic function call;
   detect the must not alias relationships not recommended for aliasing based on the response and ensuring that the custom intrinsic function call does not interfere with the optimization passes;
   and
   removing the custom intrinsic function call that was used for encoding must-not-alias relationships from the optimized IR before assembly-code generation and thereby generating an assembly code.

2. The method as claimed in claim 1, wherein said identifying comprises identifying expressions with potentially unsequenced evaluations that include side-effects through a bottom-up traversal of the AST.

3. The method as claimed in claim 2, wherein the must-not-alias relationships are derived from said expressions involving unsequenced evaluations that include side effects.

4. The method as claimed in claim 1, wherein the encoding comprises applying a custom intrinsic function call in Low Level Virtual Machine (LLVM) IR to encode the must-not-alias relationships.

5. The method as claimed in claim 4, wherein the encoding comprises wrapping variable within the custom intrinsic function into metadata nodes for depiction as auxiliary information to a Low Level Virtual Machine (LLVM) optimization engine.

6. The method as claimed in claim 1, wherein the non-optimized IR representation comprises the must-not-alias relationships inline.

7. The method as claimed in claim 1, wherein the execution of the optimization passes on the non-optimized IR comprises querying by a compiler.

8. The method as claimed in claim 1, wherein the execution of the optimization passes on the non-optimized IR comprises receiving a response in response to the queries by the compiler, the response including at least one of:
   MAY-ALIAS and MUST-NOT-ALIAS.

9. A computing system comprising:
   a memory;
   a processor to execute instructions stored within the memory and configured for:
      converting a source code into an abstract syntax tree (AST);
      identifying expressions involving unsequenced evaluations that include side-effects based on a traversal of the AST to thereby identify at least one must-not-alias relationship;
      encoding the identified must not alias relationships with corresponding expressions into one or more language-independent intermediate representation (IR) based on a custom intrinsic function call to thereby result in a non-optimized IR representation;
      executing an optimization pass in respect of the non-optimized IR to generate an optimized IR based on at least one of:
      extract an indication about must-not-alias relationships, said indication received as a response from one or more encoded must not alias relationships through said custom intrinsic function call; and
      detect the must-not-alias relationships not recommended for aliasing based on the response and ensuring that the custom intrinsic function call does not interfere with the optimization pass;
      and
      removing the custom intrinsic function call that was used for encoding must not alias relationships from the optimized IR before assembly-code generation and thereby generating an assembly code.

* * * * *